(12) United States Patent
Barrett

(10) Patent No.: US 8,520,030 B2
(45) Date of Patent: Aug. 27, 2013

(54) ON-SCREEN MARKER TO ASSIST USABILITY WHILE SCROLLING

(75) Inventor: Robert Alan Barrett, Surrey (CA)

(73) Assignee: Nokia Corporation, Espoo (FI)

( * ) Notice: Subject to any disclaimer, the term of this patent is extended or adjusted under 35 U.S.C. 154(b) by 1465 days.

(21) Appl. No.: 11/890,202

(22) Filed: Aug. 3, 2007

(65) Prior Publication Data
US 2009/0033684 A1  Feb. 5, 2009

(51) Int. Cl.
*G09G 5/34* (2006.01)
(52) U.S. Cl.
USPC .......................................... 345/688
(58) Field of Classification Search
CPC ....................................... G09G 5/343
USPC ........................ 345/684, 685, 688
See application file for complete search history.

(56) References Cited

U.S. PATENT DOCUMENTS

| 6,907,569 B1 | 6/2005 | Craft | 715/708 |
| 2002/0191005 A1 | 12/2002 | Paleiov | 345/684 |
| 2009/0019389 A1* | 1/2009 | Aust | 715/786 |

FOREIGN PATENT DOCUMENTS

| WO | WO 02/071199 A1 | 9/2002 |
| WO | WO 2006/022658 A1 * | 3/2006 |
| WO | WO 2008/083909 A2 | 7/2008 |

OTHER PUBLICATIONS

Microsoft WORD 2003 screenshot printouts on Oct. 8, 2010 while viewing document using Microsoft WORD 2003 View Normal, View Print Layout, and View Web Layout, 3 pages.*
IBM Technical Disclosure Bulletin, vol. 34 No. 11, Apr. 1992, pp. 480-482.

* cited by examiner

*Primary Examiner* — Jeffery A Brier
(74) *Attorney, Agent, or Firm* — Harrington & Smith

(57) ABSTRACT

In a non-limiting aspect thereof, the exemplary embodiments of this invention provide a method including placing a marker on a display, where the marker is placed automatically at a departure point on the display upon sensing a scrolling operation, and moving the marker on the display, where the marker moves with the departure point during the scrolling operation.

26 Claims, 5 Drawing Sheets

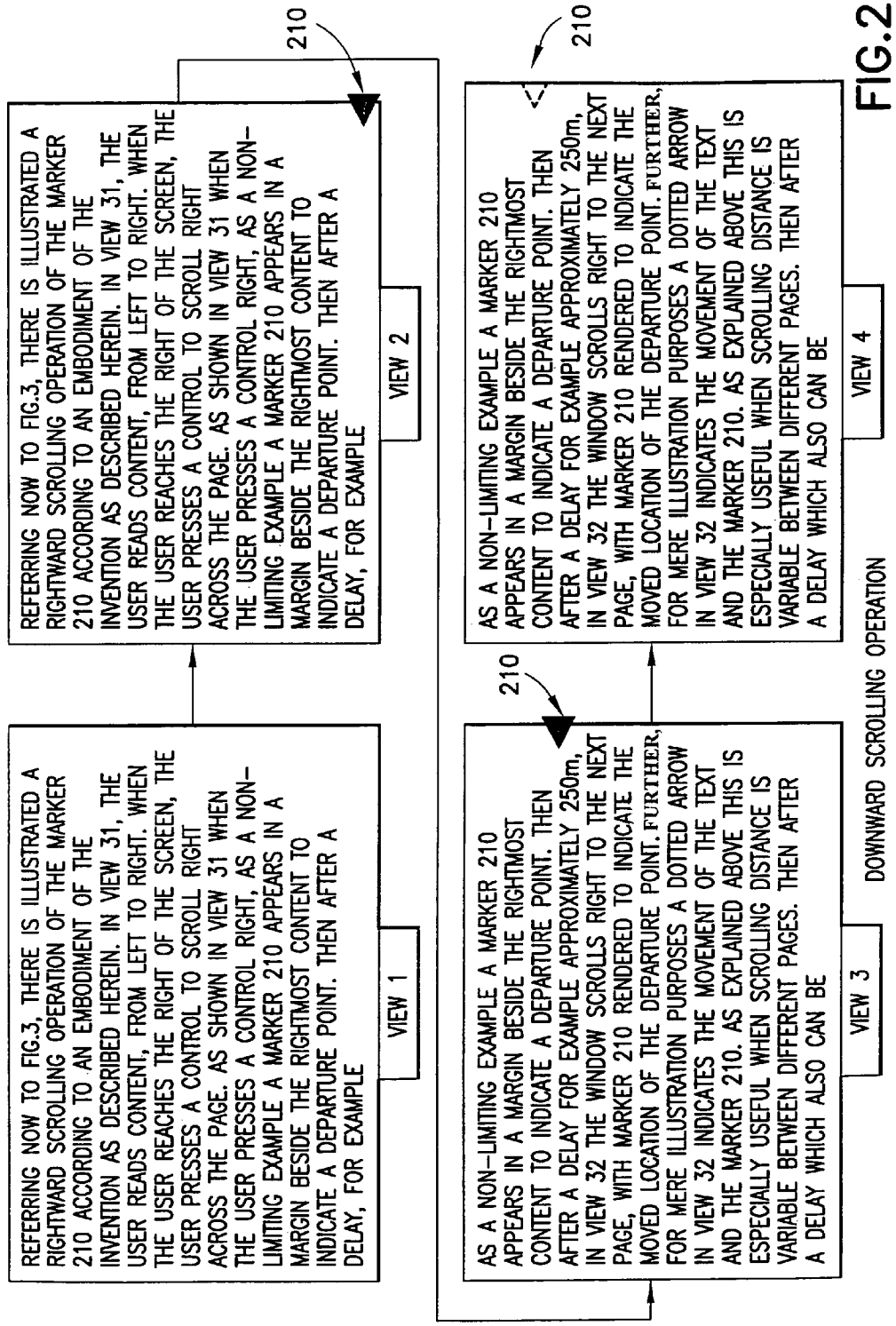

VIEW 31

REFERRING NOW TO FIG. 3, THERE IS ILLUSTRATED A RIGHTWARD SCROLLING OPERATION OF THE MARKET 210 ACCORDING TO AN EMBODIMENT OF THE INVENTION AS DESCRIBED HEREIN. IN VIEW 31, THE USER READS CONTENT, FROM LEFT TO RIGHT. WHEN THE USER REACHES THE RIGHT OF THE SCREEN, THE USER PRESSES A CONTROL TO SCROLL RIGHT ACROSS THE PAGE. AS SHOWN IN VIEW 31 WHEN THE USER PRESSES A CONTROL RIGHT, AS A NON-LIMITING EXAMPLE A MARKER 210 APPEARS IN A MARGIN BESIDE THE RIGHTMOST CONTENT TO IDICATE A DEPARTURE POINT. THEN AFTER A DELAY, FOR EXAMPLE APPROXIMATELY 250m, IN VIEW 32 THE WINDOW SCROLLS RIGHT TO THE NEXT PAGE, WITH THE MARKER 210 RENDERED TO INICATE THE MOVED LOCATION OF THE DEPARTURE ARE POINT. FURTHER, FOR MERE ILLUSTRATION PURPOSES A DOTTED ARROW IN VIEW 32 INDICATES THE MOVEMENT OF THE TEXT AND THE MARKER 210. AS EXPLAINED ABOVE THIS IS ESPECIALLY USEFUL WHEN SCROLLING DISTANCE IS VARIABLE BETWEEN DIFFERENT PAGES. THEN AFTER A DELAY WHICH ALSO CAN BE APPROXIMATELY 250m, THE MARKER 210 OPERATION IS ENDED. FURTHER, AS INDICATED THE MARKER 210 MAY BE DISPLAYED AT ANY LOCATION IN THE DISPLAY AREA

VIEW 32

210

RIGHTWARD SCROLLING OPERATION

FIG.3

ON-SCREEN MARKER TO ASSIST USABILITY WHILE SCROLLING

TECHNICAL FIELD

The exemplary embodiments of this invention relate generally to a user interface for displaying content and scrolling though displayed content.

BACKGROUND

On a limited size PC screen the handling of a large document and scrolling data contained in the document is somewhat difficult, since only a small amount of data can be simultaneously displayed on the screen. Moreover, in a mobile terminal the size of the screen is even further restricted due to the small size of the device. As a result, handling of large documents and scrolling their content on any device using a display screen can be difficult.

Hereinafter, the term document is used for referring to any kind of file containing data that may be viewed on a screen and scrolled up and down on the screen. Such a document may be a text document, a www page or some other file.

The most common means for scrolling contents of a document in current applications is a vertical scroll bar placed on either side of the screen or application window. Scrolling may be implemented also by means of push buttons; one pointing upward and one pointing downward. Pushing such button may move document for example one or more lines or pages up or down. Also a combination of a scroll bar and push buttons is possible.

FIGS. 6A and 6B show an example of a conventional scroll bar 600, which comprises an upward pointing arrow 601, downward pointing arrow 602, and an elevator 603. Single clicking the upward pointing arrow 601 moves a document a certain number of lines up, single clicking the downward pointing arrow 602 moves document a certain number of lines down. Single clicking the empty space within the scroll bar, above or below the scroll bar, moves the document a certain number of screens up or down.

Sliding the elevator 603, 603' up or down in the scroll bar moves the view anywhere in the document. The size of the elevator 603, 603' is relative to the length of the document. When the elevator in the scroll bar is very small, there is a lot of content on the document. This kind of situation is shown in FIG. 6B (elevator 603'). If the elevator is big, there is only a small amount of content on the document. This kind of situation is shown in FIG. 6A (elevator 603). Thus, if the document is long, a relatively small movement of the elevator scrolls up or down a relatively large amount of data.

Scrolling usually may also be accomplished by means of certain keys, such as cursor moving keys or arrow keys, in a keypad, or by the use of a soft key or keys.

Content may be scrolled also in horizontal direction if the content of a document does not fit into the screen or window in its full width. Further, scrolling in horizontal direction may also be necessary if the length of document in a horizontal direction is large. Therefore both vertical and horizontal scrolling can create difficulties for a user.

There are a number of problems with scrolling in an application. Although the problems with scrolling addressed by the invention are related to any electronic device with a display, the difficulties with scrolling on a mobile terminal are especially pronounced. For example, in a mobile terminal or some other mobile device having a relatively small screen, the use of scroll bars described above may be especially difficult or impractical, since the screen, and thereby also the scroll bar, is usually small in relation to the length of the document. In this case even a small movement of the scroll bar up or down moves a relatively large amount of data. The user may tend to lose their place during the scroll. Further, in some applications a scroll distance is not constant for every repeated scroll action. For example, some mobile web browsers combine scrolling with user controlled movement on the screen pointer. With every movement, the screen scrolls to the next closest body of text, link or image, and this variable movement increases the chance of user losing their place when scrolling. Further, this may result in the document being scrolled more than the user actually intended or make finding the right point in a large document difficult.

Many applications which run on a mobile device do not have a scrollbar on the screen at least in order to save valuable screen space. In addition, depending on the way the application implements scrolling (which can vary between applications) scrolling up or down is not always accomplished at a constant rate. It is common for the user to lose their place and have to scan or reread text in order to determine where to continue reading the content. Further, for the same reasons scrolling sometimes does, and sometimes does not overlap the last line or lines of text from one page to another. If the scrolling does overlap the overlap can be displayed at the top or bottom depending on the direction of scrolling. The overlap can especially be difficult to anticipate as it may depend on the size and type of document being scrolled. Thus, scrolling may confuse some users and require unproductive time expended by the user to rescan the document in order to find where they left off after a scanning operation.

To address these problems there is a need to provide interface components that better suit scrolling within applications in an electronic device. Accordingly, there is a need to improve scrolling especially in mobile devices having a relatively small screen.

SUMMARY

In an exemplary aspect of the invention, there is a computer readable medium encoded with a computer program executable by a processor to perform actions comprising placing a marker on a display, where the marker is placed automatically at a departure point on the display upon sensing a scrolling operation, and moving the marker on the display, where the marker moves with the departure point during the scrolling operation.

In another exemplary aspect of the invention, there is a method, comprising placing a marker on a display, where the marker is placed automatically at a departure point on the display upon sensing a scrolling operation, and moving the marker on the display, where the marker moves with the departure point during the scrolling operation.

In yet another exemplary aspect of the invention, there is a device comprising a display screen, a user interface configured to receive a user input to initiate and control a scrolling operation, a processor configured to respond to the user input and to place a marker on the display, where the marker is placed automatically at a departure point on the display upon sensing a scrolling operation, and the processor further configured to move the marker on the display, where the marker moves with the departure point during the scrolling operation.

In still another exemplary aspect of the invention, there is an electronic device comprising means for displaying data, means for receiving a user input to initiate and control a scrolling operation, and means for responding to the user input and placing a marker on the display, where the marker is placed automatically at a departure point on the display upon sensing a scrolling operation, and for moving the marker on the display means, where the marker moves with the departure point during the scrolling operation.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 2 illustrates a virtual marker in a document view according to an embodiment of the invention;

FIG. 3 illustrates a virtual marker in a document view according to further embodiments of the invention;

DETAILED DESCRIPTION

Figure 1:
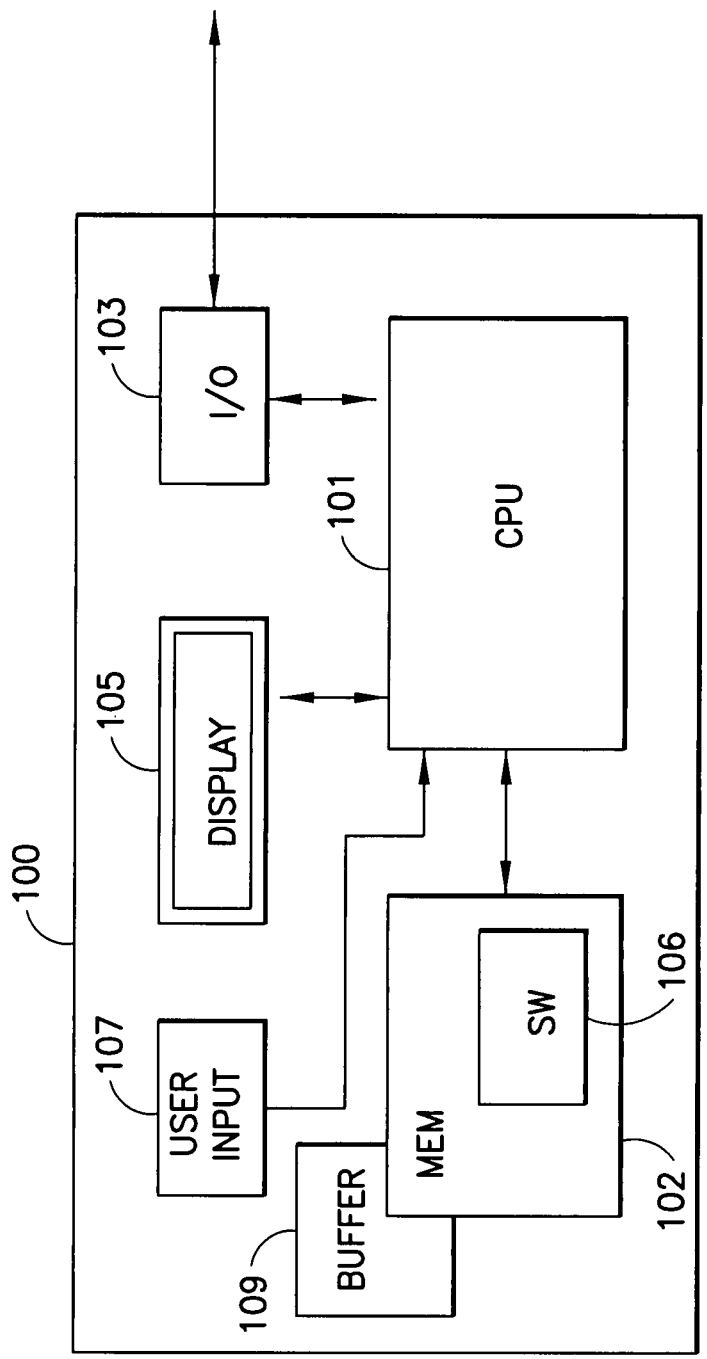
FIG. 1 shows a an electronic device according to an embodiment of the invention.

It would be desirable to provide techniques that eliminate loss of position or departure points when performing scrolling operations. In addition, it would be desirable to be able to determine a position during scrolling operations regardless of the amount or type of content being scrolled.

As previously described, there are a number of problems with scrolling in an electronic device, at least one of which is that a user can lose his position during a scrolling operation. In present applications a user has to rely on imprecise means, which may include a scroll bar, in order to determine a departure point during the scrolling operation.

By contrast, exemplary embodiments of the present invention provide a virtual marker to assist usability while scrolling within applications. When the user scrolls down, a marker appears. As the displayed data scrolls, the marker stays pointed at a departure point. When the scroll operation is finished, the marker may disappear after a delay.

Describing an exemplary embodiment of this invention in further detail, when the user, application, or device starts a scrolling operation the invention senses the scrolling operation and a marker automatically appears so as to indicate or point to a departure point. Further, as the displayed data scrolls, the marker also moves and remains pointed to the departure point determined when the scrolling operation is started. In a non-limiting example of an exemplary embodiment of the invention the departure point of the displayed data may be in the lowermost portion of the displayed data, or it may be in the uppermost portion of the displayed data. Further, in another non-limiting example the departure point could be in a leftmost portion or rightmost portion of the displayed data. The location or movement of the departure point relating to a scrolling operation is not limited and may be configured as appropriate for the displayed content.

As a non-limiting embodiment of the invention, the departure point as applied herein refers to a point on the display which can be closest to the edge of display in the direction of the scrolling operation. For example, the departure point may be closest to the edge at the uppermost point of the display during a start of an upward scrolling operation. Similarly, the departure point may be closest to the edge at the leftmost portion of the display at the start of a leftward scrolling operation. In this manner, the departure point moves away from the edge in to the display area during the scrolling operation.

Referring now to FIG. 2, there is illustrated a downward scrolling operation of the marker according to an embodiment of the invention as described herein. In view 1, the user reads content, from top to bottom. When the user reaches the bottom of the screen, the user activates or presses a control to scroll down the page. As shown in view 2 when the user activates or presses the control to scroll down, as a non-limiting example the marker 210 appears in margin beside the lowermost content to indicate a departure point. Then after a delay, for example approximately 250 ms, in view 3 the window scrolls to the next page, with the marker 210 rendered to indicate the location of the departure point. As explained above this is especially useful when scrolling distance is variable between different pages, or when a scrolling movement is proportionally less than a height of a page scrolled. Then in view 4, there is illustrated by a dashed line representation of the marker 210 an indication that the marker 210 is configurable to remain or not remain after the scrolling operation.

In a non-limiting example of an exemplary embodiment of the invention, when the scrolling operation is finished or ended, the marker 210 is configurable to disappear or fade from view. Further, in a non-limiting embodiment of the invention, the marker 210 is removed after a delay which also could be approximately 250 ms.

In another non-limiting embodiment of the invention, the marker 210 remains at the departure point or another point on the display in view 4 of FIG. 2. In addition, the time the marker 210 remains on the display is configurable.

In yet another non-limiting example of an exemplary embodiment of the invention, when the scrolling operation is finished or ended, the marker 210 is configurable to remain indefinitely. As another non-limiting embodiment the marker can remain indefinitely until sensing a user, application, or device input.

As another non-limiting example of an exemplary embodiment of the invention, the departure point location determined at a start of a scrolling operation can depend on the direction of the scrolling operation. As a non-limiting example during a downward scrolling operation the departure point can be in the lowermost portion of the displayed data and during an upward scrolling operation the departure point determined at the start of a scrolling operation could be in the uppermost portion of the displayed data. Further, as another non-limiting example the departure point determined at the start of a scrolling operation can be a leftmost portion of the displayed data or a right most portion of the displayed data dependent upon a left direction or right direction scrolling operation.

Referring now to FIG. 3, there is illustrated a rightward scrolling operation of the marker 210 according to an embodiment of the invention as described herein. In view 31, the user reads content, from left to right. When the user reaches the right of the screen, the user presses a control to scroll right across the page. As shown in view 31 when the user activates or presses a control right, as a non-limiting example a marker 210 appears in a margin beside the rightmost content to indicate a departure point. Then after a delay, for example approximately 250 ms, in view 32 the window scrolls right to the next page, with the marker 210 rendered to indicate the moved location of the departure point. Further, for mere illustration purposes a dotted arrow in view 32 indicates the movement of the text and the marker 210. As explained above this is especially useful when scrolling distance is variable between different pages.

In a non-limiting example after the scrolling operation ends or the user selects a different operation, the marker 210 is configurable to disappear. In addition, in another non-limiting embodiment of the invention the marker 210 is configurable to remain on the display after the scrolling operation ends. Further, as indicated the marker 210 can remain displayed at any location in the display area.

Further, as a non-liming example of an exemplary embodiment of the invention the displayed content scrolled can be in any language or form. Similarly, the displayed content scrolled can be read in any direction such as but not limited to left to right, right to left, top to bottom, and bottom to top. As a further non-liming example of an exemplary embodiment of the invention the marker 210 can be placed at any point in the displayed content and can be moved in any direction in the displayed content.

As another non-limiting example the departure point could represent a line of a text or www page, or any coordinate of the displayed data. Further, as a non-limiting example the marker 210 location could be in a margin or the marker 210 location could be at any display location of the displayed data.

As a further non-limiting example the marker 210 is configurable to reset to a new departure point at the start of each new scrolling operation or configurable to reset to a new departure point during a continuous scrolling operation. As a non-limiting example, a continuous scrolling operation as termed in the invention can be any scrolling operation performed or maintained by a user, application, or hardware of a device which causes a scrolling operation to continue beyond a limit which could be, but is not limited to a viewable area of content. For example, where data displayed on the screen at the start of a continuous scrolling operation is no longer visible or is about to become no longer visible during a continuous scrolling operation, the marker 210 is configured to indicate a new departure points whose location may be set by the scrolling operation as discussed above. Further, as a non-limiting example the aforementioned marker resets to new departure points after each new page is viewed during a continuous scrolling operation.

As a further non-limiting example the marker 210 remains at a departure point during a continuous scrolling operation. Thus, during a continuous scroll operation or any other scrolling operation, as a page or any other viewable content area where the displayed marker 210 has been placed scrolls off the screen, the marker 210 can remain at the departure point and scroll off the screen with the page.

The exemplary embodiments of this invention also provide user controls for marker 210 display and marker 210 animation. As a non-limiting example, the user controls can allow the user to turn off or turn on marker animation which allows the user to see or not see the marker 210 move with the departure point during scrolling. Or the user controls allow the user to turn off the marker 210 entirely.

As a further non-limiting example the marker 210 is able to be configured by the user according to, but not limited by, preference or need. Such configuration can include but is not limited to color, size, image, and location.

Figure 4:
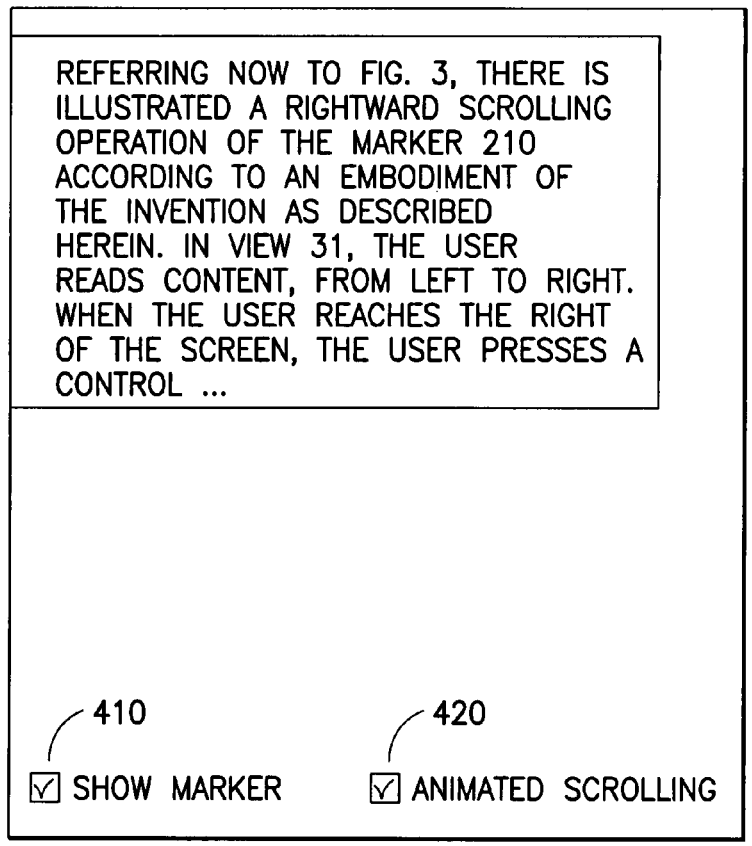
FIG. 4 illustrates a user interface for configuring an exemplary embodiment of the invention.

In FIG. 4 there is illustrated an operation of a user interface that can be provided in accordance with an exemplary embodiment of the invention. The user checks the box 410 to enable or disable the marker 210. The user controls whether the marker and the scrolling operations are animated by checking or un-checking the box 420. If the box 420 is checked then the user visualizes the scrolling movement of the text and the scrolling movement of the marker 210 with the departure point. If the box 420 is not checked the user will not visualize the scrolling movement of the text or the scrolling movement of the marker 210 with the departure point, but the user still sees the result of the text movement and still sees the result of the marker 210 movement when the scrolling operation ends. Similarly, if the box 420 is not checked and the scrolling is continuous the user will not see the scrolling text or the scrolling movement of the marker 210, but the scrolled text and moved marker 210 will appear intermittently after each page of the continuous scrolling operation.

In a further, non-limiting embodiment of the invention, the user interface allows the user to configure the marker 210 operation after a scrolling operation ends or after another operation is started. Further, the user interface could control any delay times as stated above.

Turning now to FIG. 1, there is illustrated the mobile device 100 according to an embodiment of the invention. Such device may be for example a mobile terminal, a handheld computer, a smart phone, a laptop computer, a desktop computer or some other suitable device.

The device 100 comprises a processing unit 101 and an input/output module 103 coupled to the processing unit 101. The processing unit 101 is coupled to a memory 102 and a display 105 as well. The memory 102 stores software application 106 executable in the processing unit 101. A user input 107 is coupled to the processing unit 101 enabling the user to input and control the marker 210 and the scrolling operation. The user input 107 may be embodied as a keypad/keyboard keys, soft keys, touch screen output, voice recognition unit, or any unit capable of generating a signal in respect to a user. The display buffer 109 may be considered to form a part of the memory 102, and is controlled at least in part by the software application 106. The display buffer 109 holds text (content) being displayed, and the data descriptive of the marker 210 is also stored here. The marker 210 software manages the buffer 109 to display the marker 210 as described, along with display of the content. Further, the processing unit 101 coupled to the memory 102 is executable by the software and/or the user input 107 to remove the marker 210 from the display following a scrolling operation or during another operation.

As was noted, the display 105 could be touch sensitive for enabling the user to control the scrolling operation. Further, as a non-limiting example the touch sensitive screen could enable the user to control the marker 210 function and appearance.

The processing unit 101 controls, in accordance with the software application 106, the device to show an application window on the screen 105 for displaying content to the user of the device 100. In accordance with the software application 106, the application window comprises the marker 210 placed on the display 105 at the start of a scrolling operation where as discussed above the marker 210 is placed so as to indicate or point to a departure point.

Figure 5:
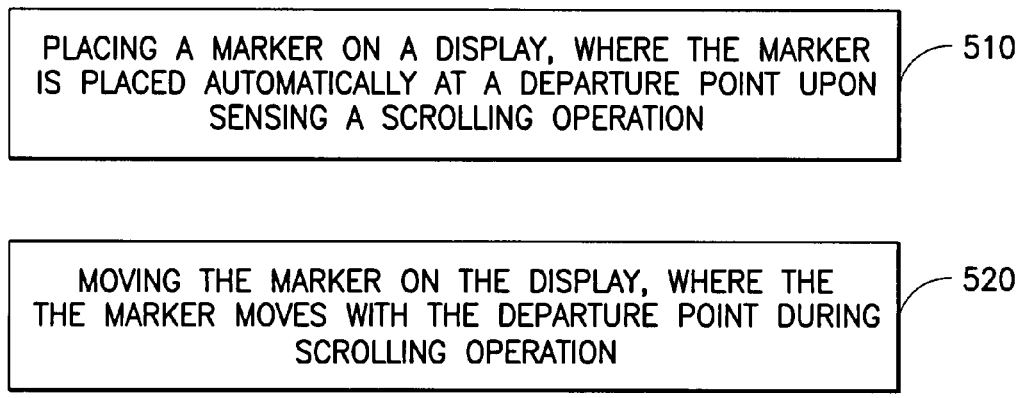
FIG. 5 illustrates in flow chart form a method according to an exemplary embodiment of the invention.
Figure 6B:
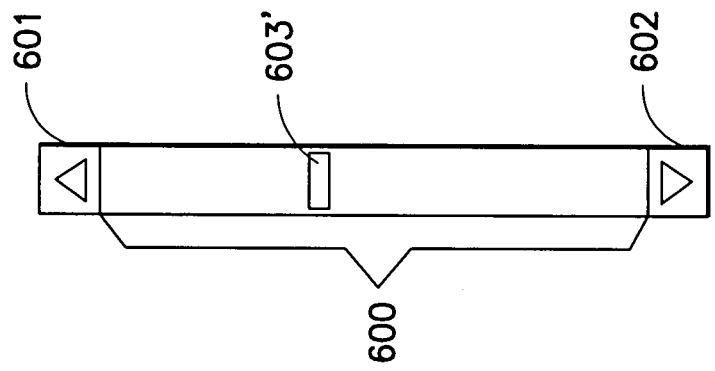
FIG. 6 illustrates an example of a conventional scroll bar displayed on an electronic device.
Figure 6A:
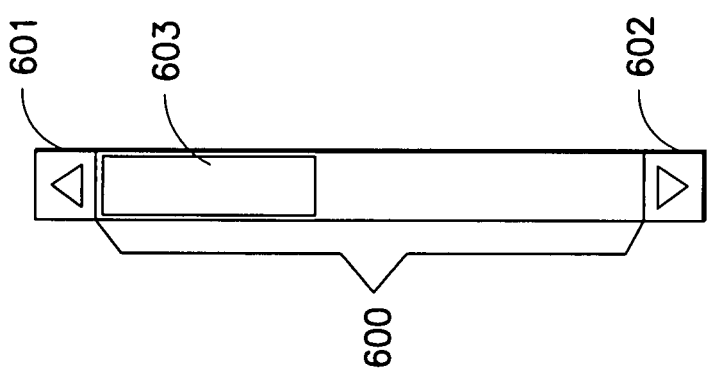

Referring now to FIG. 5, there is illustrated a method according to an exemplary embodiment of the invention. FIG. 5 illustrates placing 510 the marker 210 on the display 105, where the marker 210 is placed automatically at a departure point upon sensing a scrolling operation. Then moving 520 the marker on the display 105, where the marker 210 moves with the departure point during the scrolling operation.

Further, in a non-limiting embodiment of the invention, after the scrolling operation, the marker 210 is removed after a delay which also could be approximately 250 ms, the marker 210 can be configured to disappear when the scrolling operation is ended. Further, in another non-limiting embodiment of the invention, after the scrolling operation the marker 210 can remain at the departure point or another point on the display. In addition, the time the marker remains on the display is configurable and can be either very brief or indefinite.

The embodiments of this invention may be implemented by computer software executable by a data processor of the device 100, such as the CPU 101, or by hardware circuitry, or by a combination of software and hardware circuitry. Further in this regard it should be noted that the various blocks of the logic flow diagram of FIG. 5 may represent program steps, or interconnected logic circuits, blocks and functions, or a combination of program steps and logic circuits, blocks and functions for performing the specified tasks.

The memory 102 may be of any type suitable to the local technical environment and may be implemented using any suitable data storage technology, such as semiconductor-based memory devices, magnetic memory devices and systems, optical memory devices and systems, fixed memory and removable memory. The data processing units 201 may be of any type suitable to the local technical environment, and may include one or more of general purpose computers, special purpose computers, microprocessors, digital signal processors (DSPs), and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A non-transitory computer readable memory encoded with a computer program executable by a processor to perform actions comprising:

receiving at a user interface of a mobile device a user input to perform a scrolling operation on a display;

in response to the user input, automatically placing a marker on a display, where the marker is placed at an edge of the display corresponding to a direction of the scrolling operation; and moving the marker on the display, where the marker moves opposite the direction of the scrolling operation during the scrolling operation, where the marker resets during the scrolling operation to the edge of the display after each new page is displayed, and where the user interface comprises a user selectable object, where for a case that the user selectable object is selected then content that is scrolling according to the scrolling operation and the movement of the marker on the display are always visible to the user, and where for a case that the user selectable object is unselected and the scrolling operation is continuous then content that is scrolling according to the scrolling operation and the movement of the marker are visible to the user intermittently after each page of the continuous scrolling operation.

2. The non-transitory computer readable memory encoded with the computer program of claim 1, where the scrolling operation is a rightward scrolling operation and where the marker is placed in a margin at the edge of the display corresponding to the direction of the rightward scrolling operation.

3. The non-transitory computer readable memory encoded with the computer program of claim 1, comprising removing the marker from the display when the scrolling operation is ended, where the marker is removed after a delay configured with the user interface.

4. The non-transitory computer readable memory encoded with the computer program of claim 2, where a delay time before each new page is displayed during the rightward scrolling operation is controlled by the user interface of the mobile device.

5. The non-transitory computer readable memory encoded with the computer program of claim 1, where a color, a size, an image, and a location of the marker is configured by the user with the user interface.

6. The non-transitory computer readable memory encoded with the computer program of claim 3, where the delay is approximately 250 ms.

7. A method, comprising:

receiving at a user interface of a mobile device a user input to perform a scrolling operation on a display;

in response to the user input, automatically placing a marker on the display, where the marker is placed at an edge of the display corresponding to a direction of the scrolling operation; and moving the marker on the display, where the marker moves opposite the direction of the scrolling operation during the scrolling operation, where the marker resets during the scrolling operation to the edge of the display after each new page is displayed, and where the user interface comprises a user selectable object, where for a case that the user selectable object is selected then content that is scrolling according to the scrolling operation and the movement of the marker on the display are always visible to the user, and where for a case that the user selectable object is unselected and the scrolling operation is continuous then content that is scrolling according to the scrolling operation and the movement of the marker are visible to the user intermittently after each page of the continuous scrolling operation.

8. The method of claim 7, where the scrolling operation is a rightward scrolling operation and where the marker is placed in a margin at the edge of the display corresponding to the direction of the rightward scrolling operation.

9. The method of claim 7, comprising removing the marker from the display when the scrolling operation is ended, where the marker is removed after a delay configured with the user interface of the mobile device.

10. The method of claim 7, where a delay time before each new page is displayed during the scrolling operation is controlled by the user interface of the mobile device.

11. The method of claim 7, where a color, a size, an image, and a location of the marker is configured by the user with the user interface.

12. The method of claim 9, where the delay time is approximately 250 ms.

13. A mobile device comprising:
a display screen;
a user interface configured to receive a user input to initiate and control a scrolling operation;
a processor configured, in response to the user input to automatically place a marker on the display, where the marker is placed at an edge of the display corresponding to a direction of the scrolling operation; and
the processor further configured to move the marker on the display, where the marker moves opposite the direction of the scrolling operation during the scrolling operation, where the marker resets during the scrolling operation to the edge of the display after each new page is displayed, and where the user interface comprises a user selectable object, where for a case that the user selectable object is selected then content that is scrolling according to the scrolling operation and the movement of the marker on the display are always visible to the user, and where for a case that the user selectable object is unselected and the scrolling operation is continuous then content that is scrolling according to the scrolling operation and the movement of the marker are visible to the user intermittently after each page of the continuous scrolling operation.

14. The mobile device of claim 13, where the scrolling operation is a rightward scrolling operation and where the marker is placed in a margin at the edge of the display corresponding to the direction of the rightward scrolling operation.

15. The mobile device of claim 13, comprising the processor configured to remove the marker from the display when the scrolling operation is ended, where the marker is removed after a delay configured with the user interface of the mobile device.

16. The mobile device of claim 14, where a delay time before each new page is displayed during the rightward scrolling operation is controlled by the user interface of the mobile device.

17. The mobile device of claim 13, where a color, a size, an image, and a location of the marker is configured by the user with the user interface.

18. The mobile device of claim 15, where the delay is approximately 250 ms.

19. The mobile device of claim 13, where the mobile device is embodied in one of a smart phone and a handheld computer.

20. The mobile device of claim 13, embodied in a communications device.

21. An apparatus comprising:
at least one processor; and
at least one memory including computer program code, where the at least one memory and the computer program code are configured, with the at least one processor, to cause the apparatus, to at least:
display data on a display;
receive at a user interface a user input to initiate and control a scrolling operation on the display;
in response to the user input, automatically place a marker on the display, where the marker is placed at an edge of the display corresponding to a direction of the scrolling operation; and
move the marker on the display, where the marker moves opposite the direction of the scrolling operation during the scrolling operation, where the marker resets during the scrolling operation to the edge of the display after each new page is displayed, and where the user interface comprises a user selectable object, where for a case that the user selectable object is selected then content that is scrolling according to the scrolling operation and the movement of the marker on the display are always visible to the user, and where for a case that the user selectable object is unselected and the scrolling operation is continuous then content that is scrolling according to the scrolling operation and the movement of the marker are visible to the user intermittently after each page of the continuous scrolling operation.

22. The apparatus of claim 21, where the scrolling operation is a rightward scrolling operation and where the marker is placed in a margin on the edge of the display corresponding to the direction of the rightward scrolling operation.

23. The apparatus of claim 21, comprising the at least one memory including the computer program code is configured, with the at least one processor, to remove the marker from the display when the scrolling operation is ended, where the marker is removed after a delay configured with the user interface.

24. The apparatus of claim 22, where a delay time before each new page is displayed during the rightward scrolling operation is controlled by the user interface of the apparatus.

25. The apparatus of claim 21, where a color, a size, an image, and a location of the marker is configured by the user with the user interface.

26. The apparatus of claim 23, where the delay is approximately 250 ms.

* * * * *